United States Patent [19]

Pieper

[11] Patent Number: 5,451,067
[45] Date of Patent: Sep. 19, 1995

[54] CHUCK KEY WITH INTEGRAL HOLDER

[76] Inventor: Julius A. Pieper, 5070 N. 35th St., Milwaukee, Wis. 53209

[21] Appl. No.: 324,749

[22] Filed: Oct. 18, 1994

[51] Int. Cl.⁶ .......................................... B25B 13/44
[52] U.S. Cl. .................................... 279/149; 24/304; 81/16; 248/52
[58] Field of Search ................. 279/147, 149; 24/304, 24/DIG. 11; 81/16; 248/51, 52, 683; 408/241 R

[56] References Cited

U.S. PATENT DOCUMENTS

| | | |
|---|---|---|
| 2,529,567 | 11/1950 | Neck . |
| 2,824,651 | 2/1958 | Davis . |
| 2,941,426 | 6/1960 | Muller et al. . |
| 3,141,359 | 7/1964 | Bennett et al. . |
| 4,093,396 | 6/1978 | Widigs . |
| 4,186,933 | 2/1980 | Derbyshire . |
| 4,274,772 | 6/1981 | Widigs . |
| 4,334,809 | 6/1982 | Zavislake . |
| 4,534,573 | 8/1985 | Somers . |
| 4,558,495 | 12/1985 | Olsen . |
| 4,634,321 | 1/1987 | McClelland . |
| 4,718,797 | 1/1988 | Purviance . |
| 4,790,696 | 12/1988 | Williams . |
| 4,986,554 | 1/1991 | Rathbun . |
| 4,997,194 | 3/1991 | Krohn . |
| 5,071,296 | 12/1991 | Dietzen et al. . |

*Primary Examiner*—Steven C. Bishop
*Attorney, Agent, or Firm*—Andrus, Sceales, Starke & Sawall

[57] ABSTRACT

A chuck key with integral holder is disclosed. In one embodiment, the handle is generally U-shaped and capable of receiving electrical cords of various diameters. In another embodiment, the handle is semi-circular and capable of receiving various sized electrical cords. The chuck key is retained to the electrical cord with adhesive tape, such as electrical tape. This allows the chuck key to be firmly mounted to one location on the electrical cord, while also allowing easy relocation to alternate attaching locations on the cord.

15 Claims, 1 Drawing Sheet

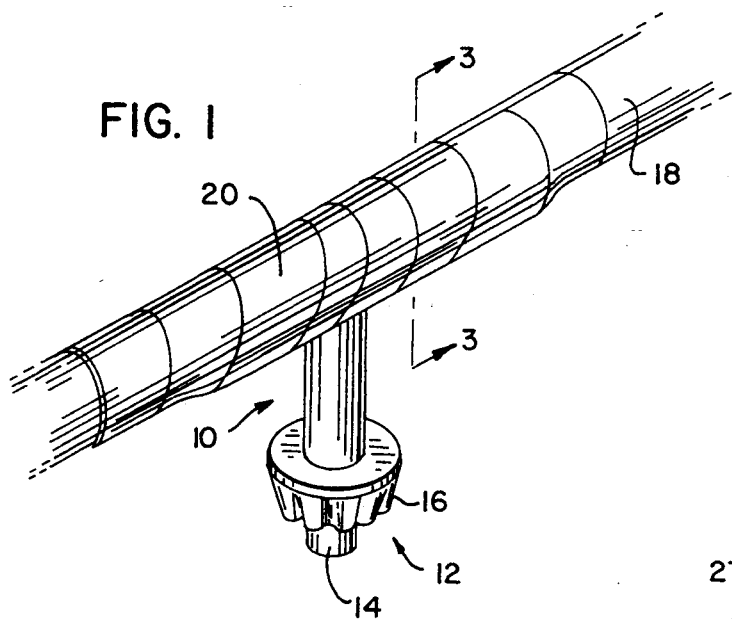
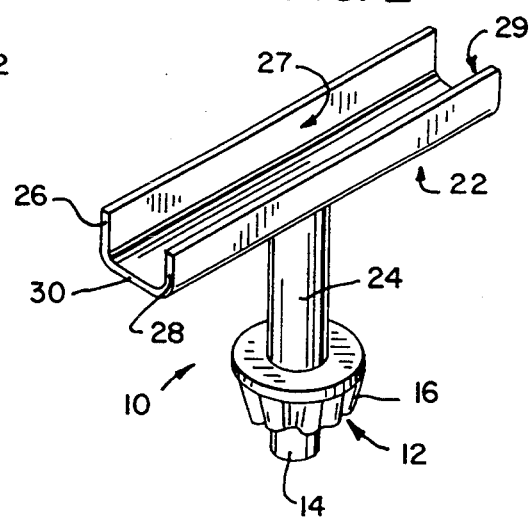
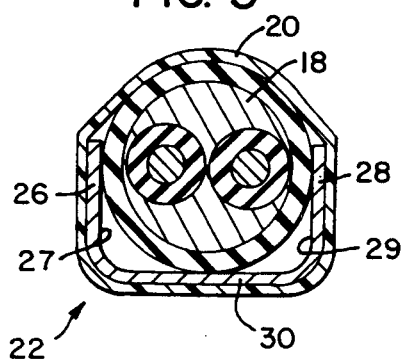
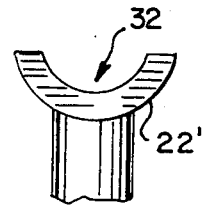
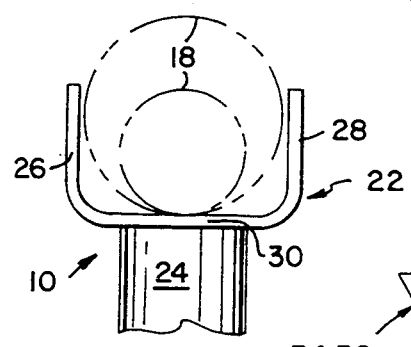
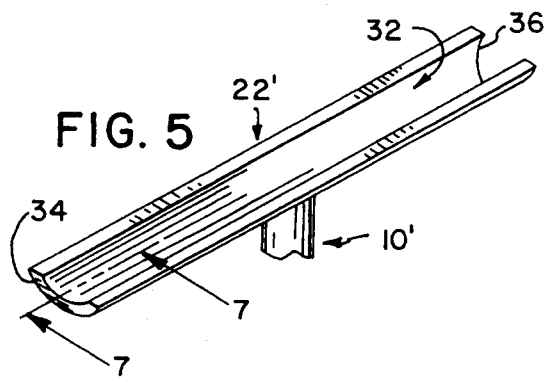
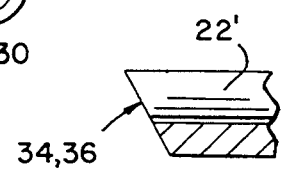

CHUCK KEY WITH INTEGRAL HOLDER

BACKGROUND OF THE INVENTION

The invention relates to a chuck key used for adjusting a chuck, and more particularly to a chuck key with an integral holder for attaching the chuck key to an electrical cord of a power tool.

In order to open and securely close a chuck of a power tool such as an electrical drill, a chuck key is normally required. Without the chuck key, an operator is not able to change drill bits or drive bits. Therefore, it is important to retain the chuck key in a convenient location to accommodate rapid changing of drill bits and other driving bits.

Various prior art devices have been used to retain the chuck key to the tool with which it is used. Some include a retaining strap to tie the chuck key to the electrical cord of the tool. This method however, allows the chuck key to dangle and slide on the electrical cord such that it is difficult to locate quickly and may become caught on foreign objects as the drill is being moved.

Other attempts to retain the chuck key to an electrical cord include retaining grooves and clips which press fit the chuck key onto the electrical cord. However, these retaining devices are dependent upon the size of the electrical cord and are not universally adaptable to various size electrical cords.

SUMMARY OF THE INVENTION

The present invention overcomes the shortcomings of the prior art devices by providing a chuck key with an integral holder capable of being retained at any location on various size electrical cords, while still maintaining the flexibility of relocating the chuck key if desired.

In accordance with the invention, a chuck key has a handle with a channel for receiving the electrical cord. The handle is perpendicular to the key portion. The handle and key portion form a generally T-shaped structure to provide leverage for adjusting the chuck when the key portion is engaged with the chuck. In one embodiment, the handle is constructed of substantially parallel sides and a bottom that is substantially perpendicular to the sides to form a U-shaped channel in the handle to accommodate electrical cords of various sizes. The chuck key handle is attached to the electrical cord by inserting the cord into the U-shaped handle and wrapping adhesive tape around the handle and cord.

In another embodiment, the handle is constructed to form a semi-circular channel capable of accommodating various sized electrical cords. The handle may also have chamfered ends to allow gradual transition from the handle to the electrical cord.

These structures allow the chuck key to be firmly retained to electrical cords having various diameters while allowing the chuck key to be relocated anywhere on the electrical cord by simply removing the tape, sliding the chuck key to the desired location, and re-wrapping with tape.

The invention also contemplates a method of connecting a chuck key to a power cord, substantially in accordance with the foregoing summary.

Various other features, objects and advantages of the invention will be made apparent from the following detailed description, taken together with the drawings.

BRIEF DESCRIPTION OF THE DRAWINGS

The drawings illustrate the best mode presently contemplated for carrying out the invention.

In the drawings:

FIG. 1 is a perspective view of the chuck key of the invention applied to an electrical cord.

FIG. 2 is a perspective view of one embodiment of the chuck key of the invention.

FIG. 3 is a sectional view taken along line 3—3 of FIG. 1.

FIG. 4 is a side elevational view of a portion of the chuck key of FIG. 2.

FIG. 5 is a partial perspective view of another embodiment of the chuck key of the invention.

FIG. 6 is a side elevation view of a portion of the chuck key of FIG. 5.

FIG. 7 is a sectional view taken along line 7—7 of FIG. 5.

DETAILED DESCRIPTION OF THE PREFERRED EMBODIMENT

FIG. 1 shows a chuck key 10 having a key portion 12 comprising guide 14 and beveled gear 16. Chuck key 10 is attached to an electrical cord 18 with adhesive tape 20.

As shown in FIG. 2, chuck key 10 has a handle 22 attached to key portion 12 by shaft 24 in a T-shaped arrangement. Handle 22 includes a longitudinal channel extending throughout its length. In the embodiment of FIG. 2, the channel is generally U-shaped having parallel sides 26 and 28 and a bottom 30 that is substantially perpendicular to sides 26 and 28. Handle 22 is preferably made of metal to accommodate the rotational force required to turn key portion 12 when engaged with a tool chuck. Sides 26 and 28 have flat, planar inside surfaces 27 and 29, respectively, which do not hinder the insertion or removal of cord 18.

As shown in FIG. 3, handle 22 is sized to accommodate a typical electrical cord 18 within the channel defined by parallel sides 26 and 28 and bottom 30. Electrical cord 18 is retained in handle 22 by applying adhesive tape 20 around the circumference of handle 22 and electrical cord 18 along the length of handle 22 as shown in FIG. 1. A common adhesive tape to use to retain the cord to the handle may be electrical tape.

FIG. 4 shows an end view of chuck key 10 and shows the capability of handle 22 to accommodate various size electrical cords 18. Since the present invention uses an adhesive tape to retain the electrical cord 18 to handle 22, without any clips or grooves in handle 22, the present invention is readily adaptable to electrical cords having various diameters. Preferably, handle 22 is constructed of a somewhat malleable metal to allow a user to bend sides 26 and 28 slightly if an electrical cord larger than handle 22 is encountered.

FIG. 5 shows another embodiment of chuck key 10' having a handle 22' which forms a semi-circular channel 32. As shown in FIG. 6, semi-circular channel 32 does not have any protrusions, grooves, or other restrictions to retain the electrical cord in handle 22'. The present chuck key is therefore readily adaptable to various size electrical cords by applying adhesive tape around the cord and handle as previously described.

As shown in FIGS. 5 and 7, handle 22' has chamfered ends 34 and 36 to provide a gradual transition from handle 22' to an electrical cord.

In both embodiments, it is contemplated that handle 22 and key 12 will form integrally with each other, or that the end of shaft 24 will be secured to handle 22 by welding, brazing or the like.

It is recognized that equivalents, alternatives, and modifications are possible within the scope of the appending claims.

We claim:

1. A chuck key for a power tool having an electrical cord and a chuck comprising:
   a key portion engageable with the chuck; and
   a handle substantially perpendicular to, and integral with, the key portion, the handle comprising planar sides forming a U-shape over the entire length of the handle for receiving the electrical cord.

2. The chuck key of claim 1 wherein the planar sides of the U-shaped handle receiving the electrical cord are further defined as a pair of substantially parallel sides and the handle further comprises a bottom substantially perpendicular to the sides.

3. The chuck key of claim 1 further comprising a strip of adhesive tape for holding the electrical cord to the U-shaped handle.

4. The chuck key of claim 1 wherein the handle is comprised of metal.

5. The chuck key of claim 1 wherein an open side of the U-shaped handle is opposite the key portion.

6. The chuck key of claim 1 wherein the handle and key portion are generally T-shaped.

7. A chuck key for a power tool having an electrical cord and a chuck comprising:
   a key portion engagable with the chuck;
   a handle having a semi-circular channel capable of freely receiving the electrical cord;
   a retaining means for securing the electrical cord to the handle; and
   a shaft connecting the key portion to the handle.

8. The chuck key of claim 7 wherein the retaining means comprises adhesive tape for retaining the electrical cord to the handle.

9. The chuck key of claim 7 wherein the handle is further defined to comprise chamfered end portions.

10. The chuck key of claim 7 wherein the handle and key portion are generally T-shaped.

11. The chuck key of claim 7 wherein the handle is comprised of metal.

12. A method of retaining a chuck key to an electrical cord comprising the steps of:
    interconnecting a handle with the chuck key, the handle defining a longitudinal channel;
    inserting the electrical cord into the channel; and
    taping the electrical cord to the handle.

13. The method of claim 12, wherein the channel is defined by flat, planar inside surfaces on the handle.

14. The method of claim 12, wherein the channel is defined by an arcuate wall on the handle.

15. A chuck key for a power tool having an electrical cord and a chuck comprising:
    a key portion engageable with the chuck;
    a handle substantially perpendicular to, and integral with, the key portion, the handle comprising planar sides forming a U-shape for receiving the electrical cord; and
    a strip of adhesive tape for holding the electrical cord to the U-shaped handle.

* * * * *